(12) United States Patent
Cha et al.

(10) Patent No.: US 8,713,395 B2
(45) Date of Patent: Apr. 29, 2014

(54) TRANSMITTING APPARATUS AND RETRANSMITTING METHOD

(75) Inventors: Jae Sun Cha, Daejeon (KR); Kwang Jae Lim, Daejeon (KR); Sung Cheol Chang, Daejeon (KR); Chul Sik Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 72 days.

(21) Appl. No.: 13/265,966

(22) PCT Filed: Apr. 23, 2010

(86) PCT No.: PCT/KR2010/002554
§ 371 (c)(1),
(2), (4) Date: Oct. 24, 2011

(87) PCT Pub. No.: WO2010/123306
PCT Pub. Date: Oct. 28, 2010

(65) Prior Publication Data
US 2012/0042222 A1   Feb. 16, 2012

(30) Foreign Application Priority Data

Apr. 24, 2009  (KR) .......... 10-2009-0036115
Apr. 23, 2010  (KR) .......... 10-2010-0037734

(51) Int. Cl.
*H04L 1/18*   (2006.01)

(52) U.S. Cl.
USPC .................. 714/749; 714/748; 370/328

(58) Field of Classification Search
USPC .................. 714/748, 749; 370/328
See application file for complete search history.

(56) References Cited

U.S. PATENT DOCUMENTS

2010/0205500 A1*  8/2010  Lee et al. ............. 714/748
2013/0039273 A1*  2/2013  Lee et al. ............. 370/328

FOREIGN PATENT DOCUMENTS

| JP | 2008-048325 A | 2/2008 |
| JP | 2012-502542 A | 1/2012 |
| KR | 2002-0002074 A | 1/2002 |
| KR | 2006-0080542 A | 7/2006 |
| KR | 2007-0120684 A | 12/2007 |
| KR | 2008-0106868 A | 12/2008 |
| WO | WO-2007/078156 A2 | 7/2007 |
| WO | WO-2010/027200 A2 | 3/2010 |

OTHER PUBLICATIONS

Jaesun Cha et al., "An Extended Header for ARQ retransmission", IEEE C802.16m-09/0877, Apr. 27, 2009.
Youngbin Chang et.al.: "ARQ Block usage for 16m"; IEEE C802.16m-08/1174; 20080905.
Baowei Ji; Samsung Electronics; IEEE802.16m; Headers Design; IEEE C8021, 6m-09_0481; 20090227.
Sungcheol Chang et.al.; ETRI; "Subheader and Security Extended Headers" IEEE C802.16m-09/0486; 20080309; pp. 1-7.
Shkumbin Hamiti; Nokia; IEEE802.16m System Description Document[Draft]; 80216m-08_003r8.zip; 20090410; pp. 45,59-63.

* cited by examiner

*Primary Examiner* — Sam Rizk
(74) *Attorney, Agent, or Firm* — Rabin & Berdo, P.C.

(57) ABSTRACT

In a retransmitting method, at least one ARQ block included in a first PDU is fragmented into a plurality of ARQ sub-blocks, and at least one second PDU is generated from the plurality of ARQ sub-blocks. The second PDU includes a payload including an extended header and at least some of a plurality of ARQ sub-blocks. The extended header includes a field representing a sequence number of the first ARQ sub-block belonging to the payload.

23 Claims, 15 Drawing Sheets

FIG.3

| RI (1) | SN (7) | | | |
|---|---|---|---|---|
| | SN (3) | FC (2) | LSI (1) | SSN (2) |
| SSN (8) | | | | |
| END (1) | Rsvd or Length (7) | | | |
| Length (4) | | | END (1) | Rsvd or Length (3) |

FIG.5

| RI (1) = 1 | SN (7) = 0 | | | |
|---|---|---|---|---|
| SN(3) = 2 | FC(2) = 10 | LSI (1) = 0 | SSN (2) = 0 | |
| SSN(8) = 1 | | | | |
| END (1) = 0 | Rsvd or Length (7) = 0 | | | |
| Length (4) = 15 | END (1) = 1 | Rsvd or Length (3) = 0 | | |

FIG.6

| RI (1) = 1 | SN (7) = 0 | | | |
|---|---|---|---|---|
| SN(3) = 2 | FC(2) = 10 | LSI (1) = 1 | SSN (2) = 0 | |
| SSN(8) = 4 | | | | |
| END (1) = 1 | Rsvd or Length (7) = 0 | | | |

FIG.7

| L (1) | Type | Rsvd |
|---|---|---|
| MEHB1 ||| 
| ... |||
| MEHBn |||

FIG.8

| M (1) | RI (1) = 1 | FlowID (4) | FC (2) |
|---|---|---|---|
| SN (8) ||||
| SN (2) | LSI (1) | SSN (5) ||
| SSN (5) || LI (1) | Rsvd or Length (2) |
| Length (8) ||||
| Length (1) | LI (1) | Rsvd or Length (6) ||

FIG.10

| L(1) =1 | Type ||||
|---|---|---|---|---|
| M(1) = 0 | RI (1) = 1 | FC(2) = 10 | SN (4) = 0 ||
| SN(6) = 2 |||  LSI (1) = 1 | SSN (1) = 0 |
| SSN(8) = 0 |||||
| SSN (1) = 1 | LI (1) = 1 | Rsvd or Length (6) = 0 |||
| M(1) = 1 | RI (1) = 1 | FlowID(4) = 2 | FC(2) = 01 ||
| SN (8) = 0 |||||
| SN(2) = 1 | LSI (1) = 0 | SSN (5) = 0 |||
| SSN (5) = 1 ||| LI (1) = 0 | Rsvd or Length (2) = 0 |
| Length (8) = 20 |||||
| Length (1) = 0 | LI (1) = 1 | Rsvd or Length (6) = 0 |||

FIG.11

| RI (1) = 1 | SN (7) = 0 | | | |
|---|---|---|---|---|
| SN(3) = 2 | | FC(2) = 00 | LSI (1) = 1 | SSN (2) = 0 |
| SSN(8) = 2 | | | | |
| END (1) = 1 | Rsvd or Length (7) = 0 | | | |

FIG.12

| L (1) | Type | Rsvd |
|---|---|---|
| ARIB1 ||| 
| ... |||
| ARIBn |||

FIG.13

| M (1) | LSI (1) | SSN (6) |
|---|---|---|
| SSN (4) | | Rsvd (4) |

FIG.15

| M (1) | RI (1) = 1 | FlowID (4) | FC (2) |
|---|---|---|---|
| SN (8) ||||
| SN (2) | LSI (1) | SSN (5) ||
| SSN (5) || LI (1) | Rsvd or Length (2) |
| Length (8) ||||
| Length (1) | LI (1) | Rsvd or Length (6) ||

TRANSMITTING APPARATUS AND RETRANSMITTING METHOD

BACKGROUND OF THE INVENTION (a) Field of the Invention

The present invention relates to a transmitting apparatus and a retransmitting method. More particularly, the present invention relates to an automatic repeat request (ARQ) retransmitting method.

(b) Description of the Related Art

A wireless communication system generally uses a method of retransmitting a packet that fails in transmission, and an ARQ method is used as a retransmission method. In a conventional ARQ method, a protocol data unit (PDU) is formed by fragmenting a service data unit (SDU) into an ARQ block, and continuous sequence numbers are allocated to the fragmented ARQ blocks. A sequence number of the first ARQ block of ARQ blocks belonging to each PDU is indicated to each PDU such that each PDU can be reassembled at the receive side.

A method of retransmitting a PDU includes a method of rearranging and transmitting the PDU and a method of not rearranging the PDU and transmitting the PDU that fails in transmission. When rearranging and transmitting a PDU, ARQ blocks that are included in the PDU to retransmit are divided into several PDUs and transmitted.

In this case, because the size of an ARQ block that is used for initial transmission and retransmission is fixed, this method may not appropriately correspond to a wireless environment. For example, when transmission of an ARQ block having a size of 100 bytes has failed, it can increase success probability of transmission to transmit an ARQ block of a somewhat small size. However, when the size of an ARQ block to be retransmitted is limited by a predetermined size, it is difficult to increase transmission success probability.

SUMMARY OF THE INVENTION

The present invention provides a retransmitting method and a retransmitting apparatus for enhancing retransmission success probability.

An embodiment of the present invention provides a method of retransmitting a PDU in a transmitting apparatus of a wireless communication system. The method includes fragmenting at least one ARQ block that is included in a first PDU into a plurality of ARQ sub-blocks, allocating the plurality of ARQ sub-blocks to a payload of at least one second PDU, allocating a first field representing a sequence number of the first ARQ sub-block belonging to a payload of the second PDU to an extended header of the second PDU, and transmitting the second PDU.

The method may further include allocating a second field representing whether the payload of the second PDU includes a last ARQ sub-block to the extended header of the second PDU.

A part of the plurality of ARQ sub-blocks may be allocated to a payload of any one of the at least one second PDU, and other part of the plurality of ARQ sub-blocks may be allocated to a payload of another one of the at least one second PDU.

The plurality of ARQ sub-blocks may be generated by fragmenting the ARQ block in a fixed size.

A second field representing whether the second PDU is a rearranged PDU may be allocated to the extended header of the second PDU.

Another embodiment of the present invention provides a method of retransmitting a PDU in a transmission apparatus of a wireless communication system, the method including fragmenting at least one ARQ block that is included in a first PDU into a plurality of ARQ sub-blocks, generating at least one second PDU from the plurality of ARQ sub-blocks, and transmitting the second PDU. The second PDU includes an extended header and a payload including at least some of the plurality of ARQ sub-blocks. The extended header includes a first field representing whether the payload includes a last ARQ sub-block.

The extended header may further include a second field representing a sequence number of the first ARQ sub-block belonging to the payload.

The extended header may further include a second field representing whether the second PDU is a rearranged PDU.

Yet another embodiment of the present invention provides a transmitting apparatus of a wireless communication system, wherein the transmitting apparatus includes a refragmentation unit, a PDU generator, and a transmitting/receiving unit. The refragmentation unit fragments at least one ARQ block included in a first PDU into a plurality of ARQ sub-blocks and allocates the plurality of ARQ sub-blocks to a payload of at least one second PDU. The PDU generator allocates an extended header including a field representing whether a payload thereof includes a last ARQ sub-block to the second PDU. The transmitting/receiving unit transmits the second PDU.

A PDU generator of a transmitting apparatus of a wireless communication system according to another embodiment of the present invention allocates an extended header including a field representing a sequence number of the first ARQ sub-block belonging to a payload thereof to the second PDU.

BRIEF DESCRIPTION OF THE DRAWINGS

FIG. 3 shows an extended header of a PDU according to an embodiment of the present invention.

FIGS. 5 and 6 show an example of an extended header of a rearrangement PDU that is shown in FIG. 4.

FIG. 7 is shows an extended header of a PDU according to another embodiment of the present invention.

FIG. 8 is shows each extended header block of FIG. 7.

FIGS. 10 and 11 show an example of an extended header of a rearrangement PDU that is shown in FIG. 9.

FIG. 12 shows an extended header of a PDU according to yet another embodiment of the present invention, FIG. 13 shows each extended header block of FIG. 12.

FIG. 15 shows each extended header block of FIG. 14.

DETAILED DESCRIPTION OF THE EMBODIMENTS

Figure 1:
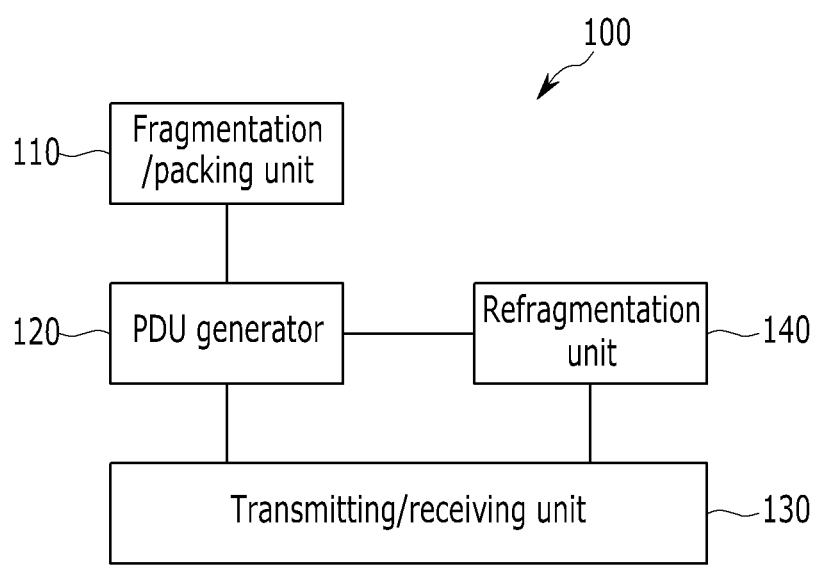
FIG. 1 is a block diagram of a retransmission apparatus according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

A terminal may indicate a mobile station (MS), a mobile terminal (MT), a subscriber station (SS), a portable subscriber station (PSS), user equipment (UE), an access terminal (AT), etc., and may include the entire function or a partial function of the MS, the MT, the SS, the PSS, the UE, the AT, etc.

Further, a base station (BS) may indicate an access point (AP), a radio access station (RAS), a node B (node B), an evolved node B (eNode B), a base transceiver station (BTS), a mobile multihop relay (MMR)-BS, etc., and may include the entire function or a partial function of the AP, the RAS, the node B, the eNode B, the BTS, the MMR-BS, etc.

Now, a transmitting apparatus and a retransmitting method according to an embodiment of the present invention will be described in detail with reference to the drawings.

Figure 2:
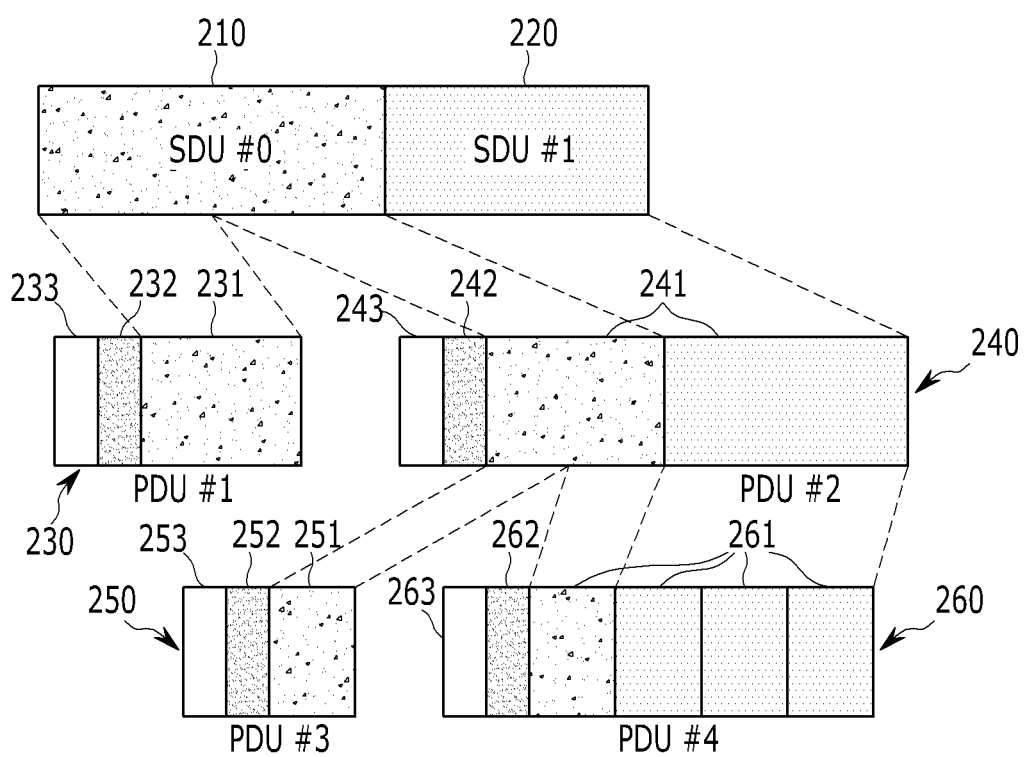
FIG. 2 shows a method of rearranging a PDU according to an embodiment of the present invention.

FIG. 1 is a block diagram of a transmission apparatus according to an embodiment of the present invention, and FIG. 2 shows illustrating a method of rearranging a PDU according to an embodiment of the present invention.

Referring to FIG. 1, a transmitting apparatus 100 includes a fragmentation/packing unit 110, a PDU generator 120, a transmitting/receiving unit 130, and a refragmentation unit 140. The transmitting apparatus 100 is formed at the transmit side, and the transmit side may be a BS in a downlink, and the transmit side may be a terminal in an uplink.

Referring to FIGS. 1 and 2, the fragmentation/packing unit 110 generates payloads 231 and 241 of PDUs 230 and 240, respectively, while fragmenting or packing or without fragmenting or packing a plurality of SDUs 210 and 220 according to the size of available resources for initial transmission. In this case, the size of the ARQ block may be varied instead of being fixed. Accordingly, each of the payloads 231 and 241 of the PDUs 230 and 240 includes at least one SDU or SDU fragment. The PDU generator 120 arranges the PDUs 230 and 240 by inserting extended headers 232 and 242 including information about an SDU or a SDU fragment belonging to the corresponding PDUs 230 and 240 into the PDUs 230 and 240, respectively. The transmitting/receiving unit 130 transmits the PDUs 230 and 240 to the receive side.

When the transmitting/receiving unit 130 receives a response representing a transmission failure of at least a part of the transmitted PDU from the receive side, the refragmentation unit 140 generates payloads 251 and 261 of PDUs 250 and 260 by fragmenting the payload 241, i.e., an ARQ block, of the PDU 240 that fails in transmission into ARQ sub-blocks. Accordingly, each of the payloads 251 and 261 of the PDUs 250 and 260 includes at least one SDU or an SDU fragment, i.e., at least one ARQ sub-block. In this case, the size of the ARQ sub-block is different from that of an ARQ block, and the size of all ARQ sub-blocks may be the same.

The PDU generator 120 inserts extended headers 252 and 262 including information of all SDUs or SDU fragments belonging to corresponding PDUs 250 and 260 into the PDUs 250 and 260, respectively, thereby rearranging the PDUs 250 and 260. The transmitting/receiving unit 130 retransmits the rearranged PDUs 250 and 260 to the receive side.

The PDU generator 120 further inserts medium access control (MAC) headers 233, 243, 253, and 263 including information of the corresponding PDU to the PDUs 230, 240, 250, and 260, respectively.

As such, according to an embodiment of the present invention, retransmission efficiency can be improved by fragmenting the block into blocks of different sizes at the time of the retransmission, that is, by varying the size of the fragmentation block. Further, because one extended header is used for all SDUs or SDU fragments belonging to the PDU without using an extended header every SDU, overhead due to the extended header can be reduced.

Next, an extended header of a PDU that is used for retransmission will be described in detail with reference to FIGS. 3 to 10.

FIG. 3 shows an extended header of a PDU according to an embodiment of the present invention.

Referring to FIG. 3, the extended header includes a retransmission indicator (RI) field, a last sub-block indicator (LSI) field, and a sub-sequence number (SSN) field, and may be used for retransmission of a PDU that is constructed from SDU(s) that is received from one connection. The extended header may be called a fragmentation and packing extended header (FPEH).

The RI field represents whether a present PDU is initially transmitted PDU or is a retransmitted (i.e., rearranged) PDU. For example, if a value of the RI field is "1", the value may represent that the present PDU is a retransmitted (i.e., rearranged) PDU. If a value of the RI field is "0", the value may represent that the present PDU is an initially transmitted (i.e., not-rearranged) PDU.

The LSI field represents whether the last ARQ sub-block of an ARQ block of the initially transmitted PDU is included in a present PDU. For example, if a value of the LSI field is "1", the value may represent that the last ARQ sub-block is included in the present PDU. If a value of the LSI field is "0", the value may represent that the last ARQ sub-block is not included in the present PDU.

The SSN field represents a sequence number of the first ARQ sub-block of the present PDU.

As such, the RI field, the LSI field, and the SSN field of the extended header can notify whether the present PDU is a rearrangement PDU, and which ARQ sub-block is included in the present PDU.

As shown in FIG. 3, the extended header may include a sequence number (SN) field, a fragmentation control (FC) field, an END field, and a length field in addition to the RI field, the LSI field, and the SSN field.

The SN field represents a sequence number of an initially transmitted PDU, i.e., an ARQ block.

The FC field represents fragmentation information of an SDU that is packed in the initially transmitted PDU and may be defined by, for example, Table 1.

TABLE 1

| FC | Meaning | Example |
|---|---|---|
| 00 | The first byte of data of in the PDU payload is the first byte of an SDU. The last byte of data in the PDU payload is the last byte of an SDU. | One or multiple unfragmented SDUs are packed in a PDU. |

TABLE 1-continued

| FC | Meaning | Example |
|---|---|---|
| 01 | The first byte of data in the PDU payload is the first byte of an SDU. The last byte of data in the PDU payload is not the last byte of an SDU. | - The PDU has only the first fragment of an SDU. - The PDU has one or more unfragmented SDUs, followed by the first fragment of subsequent. |
| 10 | The first byte of data in the PDU payload is not the first byte of an SDU. The last byte of data in the PDU payload is the last byte of an SDU. | - The PDU has only the last fragment of an SDU. - The PDU has the last fragment of an SDU, followed by one or more unfragmented subsequent SDUs |
| 11 | The first byte of data in the PDU payload is not the first byte of an SDU. The last byte of data in the PDU payload is not the last byte of an SDU. | - The PDU has only middle fragment of the SDU. - The PDU has the last fragment of an SDU, followed by zero or more unfragmented SDUs, followed by the first fragment of a subsequent SDU. |

The END field represents whether a length field exists in a next field. If the length field does not exist in the next field, bits after the END field are filled with 0s until bytes are aligned. For example, if a value of the END field is "0", the value may represent that the length field and the END field exist in the next field. If a value of the END field is "1", the value may represent that the length field does not exist in the next field. That is, if the value of the END field is "1", a reserved (Rsvd) field that is filled with 0s may be positioned instead of the length field after the END field so that a length of an extended header can be aligned.

The length field represents a length of an ARQ sub-block belonging to one SDU or SDU fragment. If the N SDUs or SDU fragments exist in one PDU, the extended header may include (N−1) length fields.

In FIG. 3, numerals that are described in brackets in each field name represent the number of bits that is allocated to each field.

The PDU further includes an MAC header in addition to the extended header of FIG. 3, and may further include another extended header. When at least one another extended header is included in the PDU, this information is recorded in the MAC header and the extended header of FIG. 3 may be positioned after the last extended header. When an indication in which at least one another extended header is included in the PDU does not exist in the MAC header, the extended header of FIG. 3 may be positioned after the MAC header. Thereby, the extended header of FIG. 3 does not include a type of a extended header and an indication in which the extended header is the last extended header that is included in the present PDU, thereby reducing overhead of the extended header.

Next, an example of the extended header of FIG. 3 will be described with reference to FIGS. 4 to 6.

Figure 4:
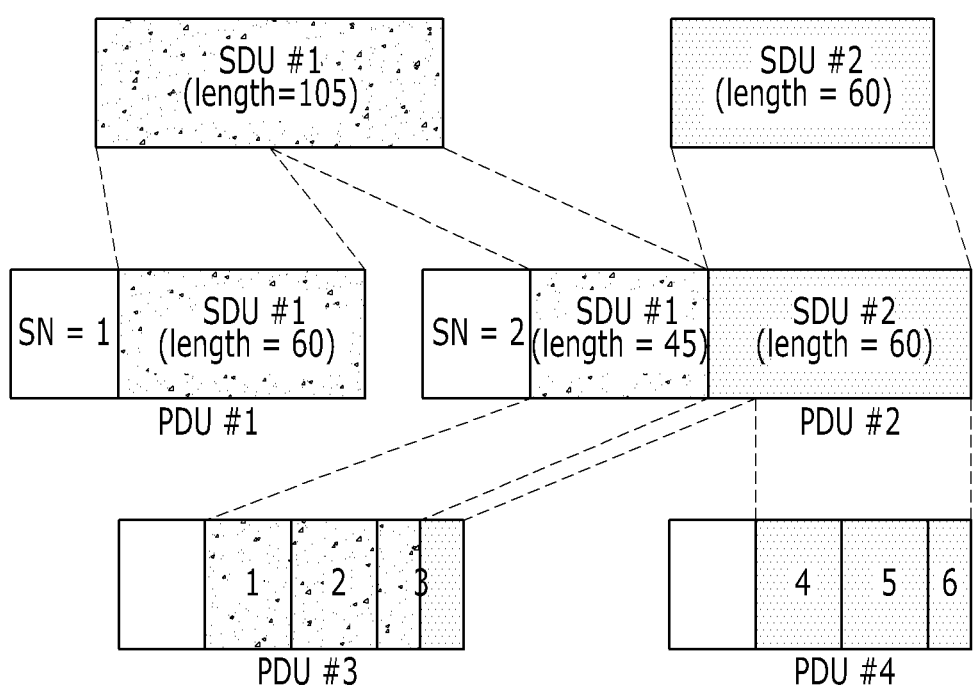
FIG. 4 shows an example of rearrangement of the PDU of FIG. 3.

FIG. 4 shows an example of rearrangement of a PDU of FIG. 3, and FIGS. 5 and 6 illustrate an example of an extended header of a rearrangement PDU that is shown in FIG. 4.

Referring to FIG. 4, the fragmentation/packing unit 110 receives an SDU #1 of a length 105 and an SDU #2 of a length 60 from one ARQ connection, fragments the SDU #1 to generate a payload of the PDU #1 with an SDU #1 fragment of a length 60 and a payload of a PDU #2 with an SDU #1 fragment of a length 45 and the SDU #2. The PDU generator 120 configures the PDU #1 by attaching an extended header in which a value of an SN field is "1" and configures the PDU #2 by attaching an extended header in which a value of the SN field is "2". The transmitting/receiving unit 130 transmits the PDUs #1 and #2. When the transmitting/receiving unit 130 receives a transmission failure response of the PDU #2 from the receive side, the refragmentation unit 140 refragments an ARQ block of the PDU #2, i.e., the SDU #1 fragment of the length 45 and the SDU #2 into ARQ sub-blocks of a length 20, generates a payload of a new PDU #3 with the first three ARQ sub-blocks, and generates a new PDU #4 with the remaining three ARQ sub-blocks. The PDU generator 120 configures PDUs #3 and #4 by attaching an extended header. That is, the PDU generator 120 rearranges the PDU #2 that fails in transmission into the PDUs #3 and #4, and the transmitting/receiving unit 130 retransmits the ARQ block of the PDU #2 through transmission of the PDUs #3 and #4.

In this case, since the length of the SDU #1 fragment that is transmitted as the PDU #2 is 45 and the length of the ARQ sub-block is 20, the payload of the PDU #3 having three ARQ sub-blocks includes an entire fragment of the SDU #1 and the first fragment of the SDU #2, and the payload of the PDU #4 includes the second fragment of the SDU #2.

Referring to an extended header of a PDU #3 that is shown in FIG. 5, an RI field has a value of "1", an SN field has a value of "2", an FC field has a value of "10", an LSI field has a value of "0", an SSN field has a value of "1", the first End field has a value of "0", the first length field has a value of "15", and the second End field has a value of "1", and the following bits are filled with 0s.

Referring to the extended header of the PDU #4 that is shown in FIG. 6, an RI field has a value of "1", an SN field has a value of '2', an FC field has a value of "10", an LSI field has a value of "1", an SSN field has a value of "4", and the first End field has a value of "1"', and the following bits are filled with 0s.

Figure 7:
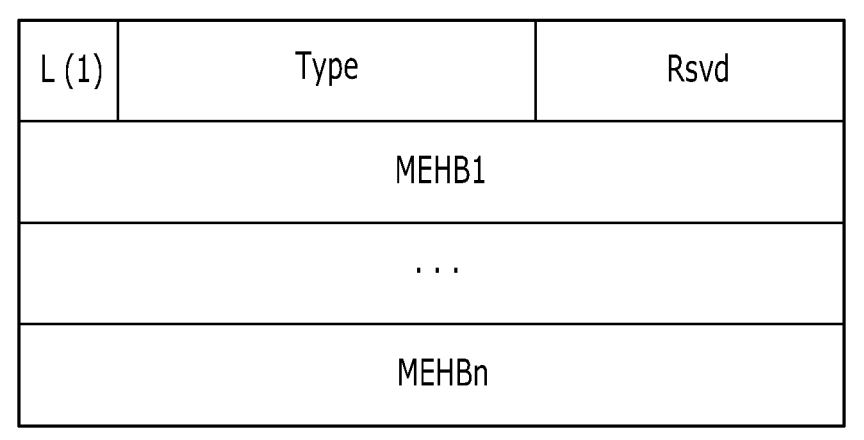

FIG. 7 shows an extended header of a PDU according to an embodiment of the present invention, and FIG. 8 is a diagram illustrating each extended header block of FIG. 7.

Referring to FIG. 7, the extended header is used for a PDU that is packed with SDUs that are received from several connections and includes a plurality of extended header blocks MEHB1 to MEHBn. The extended header may be called a multiplexing extended header (MEH), and the extended header block may be called a multiplexing extended header block (MEHB).

Each of the extended header blocks MEHB1 to MEHBn includes information of an SDU or an SDU fragment that is received from the same connection, and the number of the extended header blocks MEHB1 to MEHBn is the same as the number of connections to which an SDU or an SDU fragment of a present PDU belongs.

In this case, the extended header includes the last (L) field representing whether a corresponding extended header is the last extended header that is included in the PDU and a type field representing the type of the corresponding extended header. Further, the extended header may further include a reserved field for aligning bytes.

Referring to FIG. 8, each extended header block includes an RI field, an LSI field, and an SSN field, as in the extended header of FIG. 3, and further includes an M field and a flow identifier (FlowID) field.

The M field represents whether another extended header block exists after a present extended header block. For example, if a value of the M field is "1", the value may represent that the present extended header block is the last extended header block belonging to the extended header. If a value of the M field is "0", the value may represent that another extended header block exists after the present extended header block.

The FlowID field represents an identifier of a wireless connection that is associated with an SDU or an SDU fragment that is included in the present extended header block. The first extended header block of the extended header may not include the FlowID field. In this case, a flow identifier of the first extended header block may be regarded as having the same value as a flow identifier that is set to a MAC header of the PDU.

Further, each extended header block may further include an FC field, an SN field, a length indicator (LI) field, and a length field.

The FC field represents whether an SDU or an SDU fragment that is included in a corresponding extended header block is fragmented or packed using which method, and has the same value as that of an extended header block that is included in an initially transmitted PDU. The FC field may be defined by, for example, Table 1.

The SN field represents a sequence number of the initially transmitted PDU.

The LI field represents whether the length field exists in a next field. For example, if a value of the LI field is "0", the value may represent that the length field exists in the next field. If a value of the LI field is "1", the value may represent that the length field does not exist in the next field and a field (reserved field) for aligning bytes exists.

The length field represents a length of an ARQ sub-block belonging to the same SDU. A length of the first SDU or SDU fragment that is included in the first extended header block is not included in the extended header block. In this case, the length of the first SDU or SDU fragment may be calculated by subtracting the sum of values of length fields that are included in the remaining extended header block and a total length of the extended header from an entire length of the PDU that is included in the MAC header. If a value of the LI field before the length field is "1", a reserved field that is filled with 0s may be positioned instead of the length field after the LI field so that a length of the entire extended header block may be aligned.

Next, an example of the extended header of FIGS. 7 and 8 will be described with reference to FIGS. 9 and 11.

Figure 9:
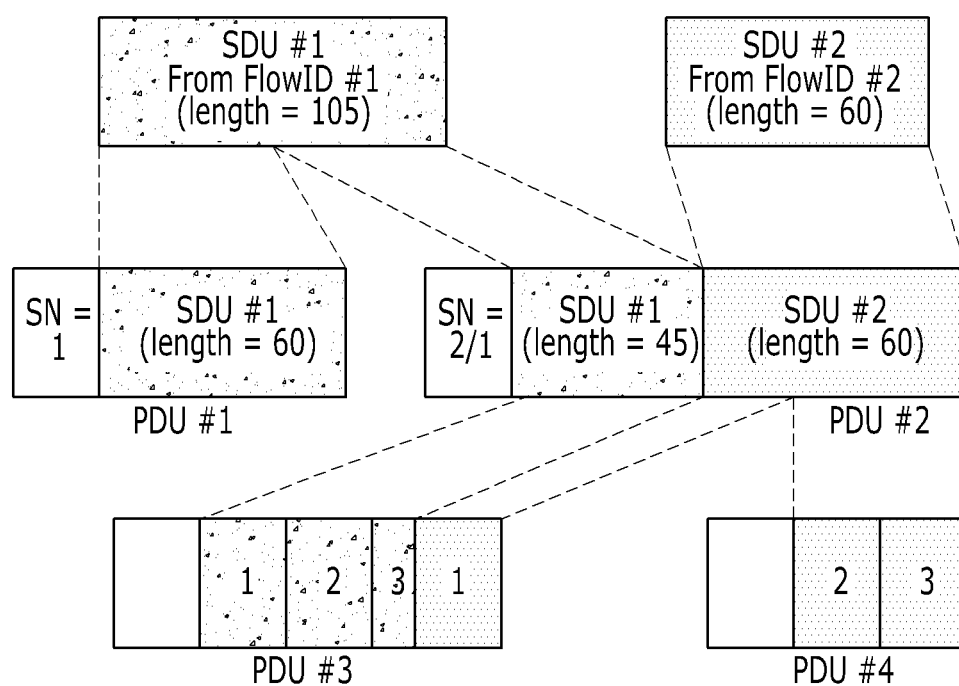
FIG. 9 is shows an example of rearrangement of a PDU of FIG. 7.

FIG. 9 shows an example of rearrangement of the PDU of FIG. 7, and FIGS. 10 and 11 show an example of an extended header of a rearrangement PDU that is shown in FIG. 9.

Referring to FIG. 9, the fragmentation/packing unit 110 receives an SDU #1 of a length 105 from one ARQ connection (FlowID #1) and an SDU #2 of a length 60 from another ARQ connection (FlowID #2). The fragmentation/packing unit 110 fragments the SDU #1 to generate a payload of a PDU #1 with an SDU #1 fragment of a length 60 and a payload of a PDU #2 with an SDU #1 fragment of a length 45 and the SDU #2. The PDU generator 120 configures the PDU #1 by attaching an extended header in which a value of an SN field is "1", and configures the PDU #2 by attaching extended headers having "2" and "1" as a value of an SN field. The transmitting/receiving unit 130 transmits the PDUs #1 and #2. When the transmitting/receiving unit 130 receives a transmission failure response of the PDU #2 from the receive side, the refragmentation unit 140 refragments each of the SDU #1 fragment of the length 45 and the SDU #2 into ARQ sub-blocks having a length of 20, generates a payload of a new PDU #3 with the first four ARQ sub-blocks, and generates a new PDU #4 with the remaining two ARQ sub-blocks. The PDU generator 120 configures PDUs #3 and #4 by attaching an extended header. That is, the PDU generator 120 rearranges the PDU #2 that fails in transmission into the PDUs #3 and #4, and the transmitting/receiving unit 130 retransmits the ARQ block of the PDU #2 through transmission of the PDUs #3 and #4. When the length of the ARQ sub-block is 20, the payload of the PDU #3 may include an entire fragment of the SDU #1 and the first fragment of the SDU #2, and the payload of the PDU #4 may include the second fragment of the SDU #2.

Referring to the extended header of the PDU #3 that is shown in FIG. 10, a value of an L field is "1", and the extended header has an extended header block for an ARQ connection of a FlowID #1 and an extended header block for an ARQ connection of the FlowID #2. In the first extended header block, an M field has a value of "0", an RI field has a value of "1", a FC field has a value of "10", an SN field has a value of "2", an LSI field has a value of "1", an SSN field has a value of "1", and an LI field has a value of "1", and the first length field, i.e., a reserved field is filled with 0s. In the second extended header block, an M field has a value of "1", an RI field has a value of "1", a FlowID field has a value of "2"", an FC field has a value of "00", an SN field has a value of "1", an LSI field has a value of "0", an SSN field has a value of "1", the first LI field has a value of "0", the first length field has a value of "20", and the second LI field has a value of "1", and the following bits are filled with 0s.

Since the PDU #4 includes only a fragment of the SDU #2 that is received from one connection (FlowID #2), an extended header of the PDU #4 is formed in a form of an extended header (FPEH) that is described in FIG. 3. Therefore, as shown in FIG. 11, in the extended header of the PDU #4, an RI field has a value of "1", an FC field has a value of "00", an SN field has a value of "1", an LSI field has a value of "1", an SSN field has a value of "2", and an End field has a value of "1", and the following bits are filled with 0s.

As described above, an extended header that is described with reference to FIGS. 3 to 11 may be used for initial retransmission as well as retransmission through a value of the RI field. Alternatively, in the following description, an extended header that is used for only retransmission separately from an extended header that is used for initial transmission will be described with reference to FIGS. 12 and 13.

Figure 12:
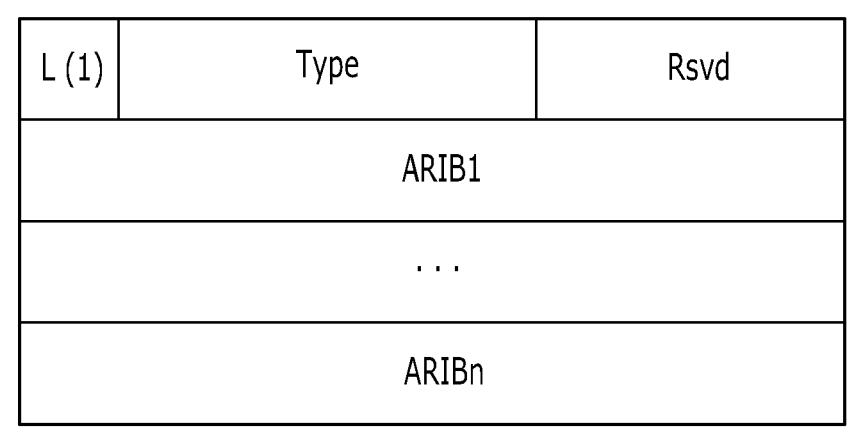
Figure 13:
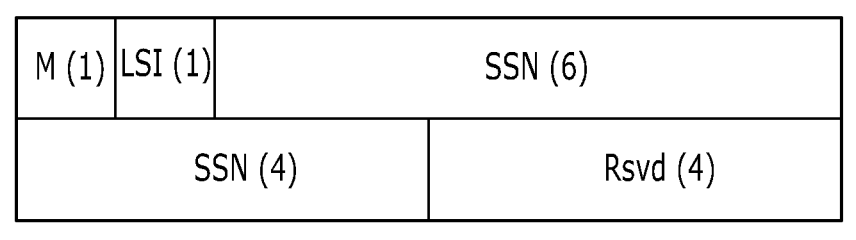

FIG. 12 shows an extended header of a PDU according to an embodiment of the present invention, and FIG. 13 shows each extended header block of FIG. 12.

Referring to FIG. 12, the extended header includes an L field and a type field and has a plurality of extended header blocks ARIB1 to ARIBn corresponding to a plurality of connections, respectively. The extended header may be called an ARQ retransmission extended header, and an extended header block may be called an ARQ retransmission information block (ARIB).

Referring to FIG. 13, each ARIB includes an M field, an LSI field, and an SSN field.

The L field, the type field, the M field, the LSI field, and the SSN field are defined as described with reference to FIGS. 3 to 11.

An extended header for one connection and an extended header for a multiple connection may be configured as one extended header, and this embodiment will be described with reference to FIGS. 13 and 14.

Figure 14:
FIG. 14 shows an extended header of a PDU according to further another embodiment of the present invention.

FIG. 14 shows an extended header of a PDU according to an embodiment of the present invention, and FIG. 15 shows each extended header block of FIG. 14.

Referring to FIG. 14, the extended header includes at least one extended header block FPMEHB1 to FPMEHBn corresponding to at least one connection, and corresponds to an integrated form of an extended header that is described with reference to FIG. 3 and an extended header that is described with reference to FIG. 7. The extended header may be called a fragmentation, packing, and multiplexing extended header (FPMEH), and the extended header block may be called a fragmentation, packing, and multiplexing extended header block (FPMEHB).

Referring to FIG. 15, each extended header block may have the same structure as the extended header block that is described with reference to FIG. 8.

However, unlike FIG. 7, the extended header does not include an L field and a type field. Instead, when an indication in which at least one another extended header is included in a PDU exists in a MAC header, the extended header of FIG. 14 may be positioned after last another extended header. When an indication in which at least one another extended header is included in the PDU does not exist in the MAC header, the extended header of FIG. 14 may be positioned immediately after the MAC header.

As described above, according to an embodiment of the present invention, upon retransmitting, the size of a block is varied, thereby increasing retransmission efficiency. Further, because one extended header is used for all SDUs or SDU fragments belonging to a PDU without using an extended header every SDU, overhead due to the extended header can be reduced.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of retransmitting a protocol data unit (PDU) in a transmitting apparatus of a wireless communication system, the method comprising:
fragmenting at least one automatic repeat request (ARQ) block that is included in a first PDU into a plurality of ARQ sub-blocks;
allocating at least one ARQ sub-block of the plurality of ARQ sub-blocks to a payload of a second PDU;
allocating a first field representing a sequence number of the first ARQ sub-block belonging to the payload of the second PDU to a header of the second PDU; and
transmitting the second PDU.

2. The method of claim 1, further comprising allocating a second field representing whether the payload of the second PDU includes a last ARQ sub-block to the header of the second PDU.

3. The method of claim 1, wherein the allocating of the at least one ARQ sub-block comprises:
allocating other part of the plurality of ARQ sub-blocks to a payload of a third PDU.

4. The method of claim 1, wherein the fragmenting of at least one ARQ block comprises generating the plurality of ARQ sub-blocks by fragmenting the ARQ block in a fixed size.

5. The method of claim 1, further comprising allocating a second field representing whether the second PDU is a rearranged PDU to the header of the second PDU.

6. The method of claim 1, further comprising allocating a second field representing a sequence number of the ARQ block to the header of the second PDU.

7. The method of claim 1, further comprising allocating a second field representing fragmentation information of a service data unit (SDU) that is packed in the first PDU to the header of the second PDU.

8. The method of claim 1, further comprising, when the payload of the second includes at least one SDU or SDU fragment, allocating a second field representing a length each SDU or SDU fragment to the header of the second PDU.

9. The method of claim 1, wherein the at least one ARQ block comprises a first ARQ block from a first connection and a second ARQ block from a second connection,
the plurality of ARQ sub-blocks comprise a plurality of first ARQ sub-blocks in which the first ARQ block is fragmented and a plurality of second ARQ sub-blocks in which the second ARQ block is fragmented,
the method further comprises allocating at least one header block to the header of the second PDU,
the at least one header block comprises at least one first header block corresponding to the first connection and at least one second header block corresponding to the second connection, and
the allocating of the first field comprises allocating the first field to each of the first and second header blocks.

10. The method of claim 9, further comprising allocating a second field representing whether the payload of the second PDU comprises a last ARQ sub-block to each of the first and second header blocks.

11. The method of claim 9, further comprising allocating a second field representing whether the second PDU is a rearranged PDU to each of the first and second header blocks.

12. The method of claim 9, further comprising allocating a second field to each of the first and second header blocks, the second field representing an identifier of connection for an ARQ sub-block that is included in a corresponding header block.

13. The method of claim 9, further comprising allocating a second field to each of the first and second header blocks, the second field representing whether another header block exists after a corresponding header block.

14. The method of claim 1, wherein the first PDU is a PDU that fails in initial transmission.

15. A method of retransmitting a PDU in a transmission apparatus of a wireless communication system, the method comprising:
fragmenting at least one ARQ block that is included in a first PDU into a plurality of ARQ sub-blocks;
generating a second PDU from at least one ARQ sub-block of the plurality of ARQ sub-blocks; and
transmitting the second PDU,
wherein the second PDU comprises:
a header; and
a payload comprising the at least one ARQ sub-block,
wherein the header comprises a first field representing whether the payload comprises a last ARQ sub-block.

16. The method of claim 15, wherein the header further comprises a second field representing a sequence number of the first ARQ sub-block belonging to the payload.

17. The method of claim 15, wherein the header further comprises a second field representing whether the second PDU is a rearranged PDU.

18. The method of claim 15, wherein the header further comprises a second field representing a sequence number of the ARQ block.

19. The method of claim 15, wherein the header further comprises a second field representing fragmentation information of an SDU that is packed in the first PDU.

20. The method of claim 15, wherein, when the payload of the second includes at least one SDU or SDU fragment, the header further comprises a second field representing a length of each SDU or SDU fragment.

21. The method of claim 15, wherein the fragmenting of at least one ARQ block comprises generating the plurality of ARQ sub-blocks by fragmenting the ARQ block in a fixed size.

22. A transmitting apparatus of a wireless communication system, comprising:
- a refragmentation unit that fragments at least one ARQ block included in a first PDU into a plurality of ARQ sub-blocks and that allocates at least one ARQ sub-block of the plurality of ARQ sub-blocks to a payload of a second PDU;
- a PDU generator that allocates a header including a field representing whether a payload thereof includes a last ARQ sub-block to the second PDU; and
- a transmitting/receiving unit that transmits the second PDU.

23. A transmitting apparatus of a wireless communication system, comprising:
- a refragmentation unit that fragments at least one ARQ block included in a first PDU into a plurality of ARQ sub-blocks and that allocates at least one ARQ sub-block of the plurality of ARQ sub-blocks to a payload of a second PDU;
- a PDU generator that allocates a header comprising a field representing a sequence number of the first ARQ sub-block belonging to a payload thereof to the second PDU; and
- a transmitting/receiving unit that transmits the second PDU.

* * * * *